(12) United States Patent
Amato et al.

(10) Patent No.: US 11,609,892 B2
(45) Date of Patent: Mar. 21, 2023

(54) METHODS AND COMPUTER ARCHITECTURE SUPPORTING A MULTI-DOMAIN OPERATIONAL PLAN

(71) Applicant: Raytheon Company, Waltham, MA (US)

(72) Inventors: Judy Y. Amato, Fairfax, VA (US); Laura D. Strater, Carrollton, TX (US); Michael H. Lewis, Leesburg, VA (US); Terry L. Keeney, Thornton, CO (US); Vincent A. Pascente, Denver, CO (US); Jared B. Dorny, Aurora, CO (US); Michael A. Young, Parker, CO (US); David B. Jenks, Littleton, CO (US); Robert T. Stratton, Annandale, VA (US); Michael P. Sica, Oak Hill, VA (US)

(73) Assignee: Raytheon Company, Waltham, MA (US)

( * ) Notice: Subject to any disclaimer, the term of this patent is extended or adjusted under 35 U.S.C. 154(b) by 592 days.

(21) Appl. No.: 16/698,459

(22) Filed: Nov. 27, 2019

(65) Prior Publication Data
US 2021/0157782 A1    May 27, 2021

(51) Int. Cl.
*G06F 16/22* (2019.01)
*G06F 16/23* (2019.01)
*G06F 9/54* (2006.01)
*G06F 11/30* (2006.01)
*G06F 11/07* (2006.01)

(52) U.S. Cl.
CPC .......... *G06F 16/2246* (2019.01); *G06F 9/546* (2013.01); *G06F 11/0772* (2013.01); *G06F 11/3006* (2013.01); *G06F 16/2322* (2019.01)

(58) Field of Classification Search
None
See application file for complete search history.

(56) References Cited

U.S. PATENT DOCUMENTS

| | | | |
|---|---|---|---|
| 2015/0052174 A1* | 2/2015 | Bose | G06F 30/398 707/797 |
| 2016/0232152 A1* | 8/2016 | Mahamood | G06F 40/186 |
| 2019/0080091 A1* | 3/2019 | Kim | H04L 63/123 |

* cited by examiner

*Primary Examiner* — Thu N Nguyen
(74) *Attorney, Agent, or Firm* — Schwegman Lundberg & Woessner, P.A.

(57) ABSTRACT

A computing machine stores a tree structure representing a hierarchical organization. The tree structure comprises a command node and a plurality of domain nodes below the command node. The computing machine leverages the tree structure to generate a multi-domain operational plan.

20 Claims, 9 Drawing Sheets

METHODS AND COMPUTER ARCHITECTURE SUPPORTING A MULTI-DOMAIN OPERATIONAL PLAN

TECHNICAL FIELD

Embodiments pertain to computer architecture. Some embodiments relate to a computer architecture for generating a multi-domain operational plan.

BACKGROUND

Decision makers for large organizations (e.g., military commanders) typically develop operational plans with multiple domains (e.g., air, land, sea, space, and cyber in the military context). Coordinating activities between the multiple domains, and assigning tasks to each domain, may be challenging.

SUMMARY

The present disclosure generally relates to processes and machines configured for generating a multi-domain operational plan and supporting its implementation.

According to some aspects of the technology described herein, a computing machine includes processing circuitry and memory. The memory stores a tree structure representing a hierarchical organization. The tree structure comprises a command node and a plurality of domain nodes below the command node.

The processing circuitry generates, at the command node, a plurality of activities associated with a multi-domain operational plan, each activity having a time and one or more parameters. The processing circuitry receives, at the command node and from each domain node, an acknowledgment of availability to participate in the multi-domain operational plan. The processing circuitry, in response to the acknowledgements from the plurality of domain nodes, for each activity in the plurality of activities: determines, based on communication between the command node and the plurality of domain nodes, one or more feasible domain nodes from among the plurality of domain nodes that are capable of providing a solution for the activity; submits a request for the activity to a first domain node from the one or more feasible domain nodes; if the first domain node approves the request, assigns, via the command node, the activity to the first domain node; if the first domain node denies the request, assigns, via the command node, the activity to a second domain node or modify the time or the one or more parameters of the activity; receives, at the command node and from a domain node assigned the activity, a verification that the activity has been completed or a failure message; and if the failure message is received, assigns, via the command node, the activity to a different domain node or modify the time or the one or more parameters of the activity. The processing circuitry, upon completion of each and every one of the plurality of activities, determines, at the command node, that the multi-domain operational plan is completed. The processing circuitry provides an output representing that the multi-domain operational plan is completed.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Decision makers for large organizations (e.g., military commanders) typically develop operational plans with multiple domains (e.g., air, land, sea, space, and cyber in the military context). Coordinating activities between the multiple domains, and assigning tasks to each domain, may be challenging. In traditional implementations, such coordinating may require many different communications between commanders and subordinates, in order to assign tasks and confirm whether the tasks can be completed, that the tasks have been completed, and the like. The COA planning processing is currently done manually (on the phone, walking between stations, collectively in a war room) at the various operation centers. These traditional implementations may require lots of resources (both from a time perspective and in terms of multiple different people) and may be error prone. As the foregoing illustrates, a machine-implemented approach for generating and/or facilitating a multi-domain operational plan may be desirable. The methods and apparatus described herein automates and digitizes the process. The techniques described herein also encompass the orchestration and data exchange required to determine who is supported and who is supporting, interfacing with the various databases, verifying that activities in a COA have been successfully determined as feasible or that they have been planned, transferring states from planning to execution, etc.

Some aspects are directed to generating a multi-domain operational plan using a computing machine. The computing machine (see, e.g., FIG. 1) stores, in an internal or external memory unit, a tree structure (see, e.g., FIG. 2) representing a hierarchical organization. The tree structure includes a command node and a plurality of domain nodes below the command node. In one embodiment, the command node generates a plurality of activities associated with a multi-domain operational plan. Each activity has a time and one or more parameters. The command node receives, from each domain node, an acknowledgment of availability to participate in the multi-domain operational plan. In response to the acknowledgements from the plurality of domain nodes, the computing machine, for each activity in the plurality of activities: (i) determines, based on communication between the command node and the plurality of domain nodes, one or more feasible domain nodes from among the plurality of domain nodes that are capable of providing a solution for the activity; (ii) submits a request for the activity to a first domain node from the one or more feasible domain nodes; (iii) if the first domain node approves the request, assigns, via the command node, the activity to the first domain node; (iv) if the first domain node denies the request, assign, via the command node, the activity to a second domain node or modify the time or the one or more parameters of the activity; (v) receives, at the command node and from a domain node assigned the activity, a verification that the activity has been completed or a failure message; and (vi) if the failure message is received, assign, via the command node, the activity to a different domain node or modify the time or the one or more parameters of the activity. Upon completion of each and every one of the plurality of activities, the command node determines that the multi-domain operational plan is completed. The computing machine provides (e.g., for display or for transmission to another computing machine) an output representing that the multi-domain operational plan is completed.

As used herein, the term "computing machine" may include a single computing machine or multiple computing machines. A computing machine may include any device or combination of devices that includes processing circuitry and memory. The processing circuitry and the memory may reside in the same device or in different devices.

Throughout this document, some method(s) (e.g., in FIG. 3) are described as being implemented serially and in a given order. However, unless explicitly stated otherwise, the operations of the method(s) may be performed in any order. In some cases, two or more operations of the method(s) may be performed in parallel using any known parallel processing techniques. In some cases, some of the operation(s) may be skipped and/or replaced with other operations. Furthermore, skilled persons in the relevant art may recognize other operation(s) that may be performed in conjunction with the operation(s) of the method(s) disclosed herein.

Figure 1:
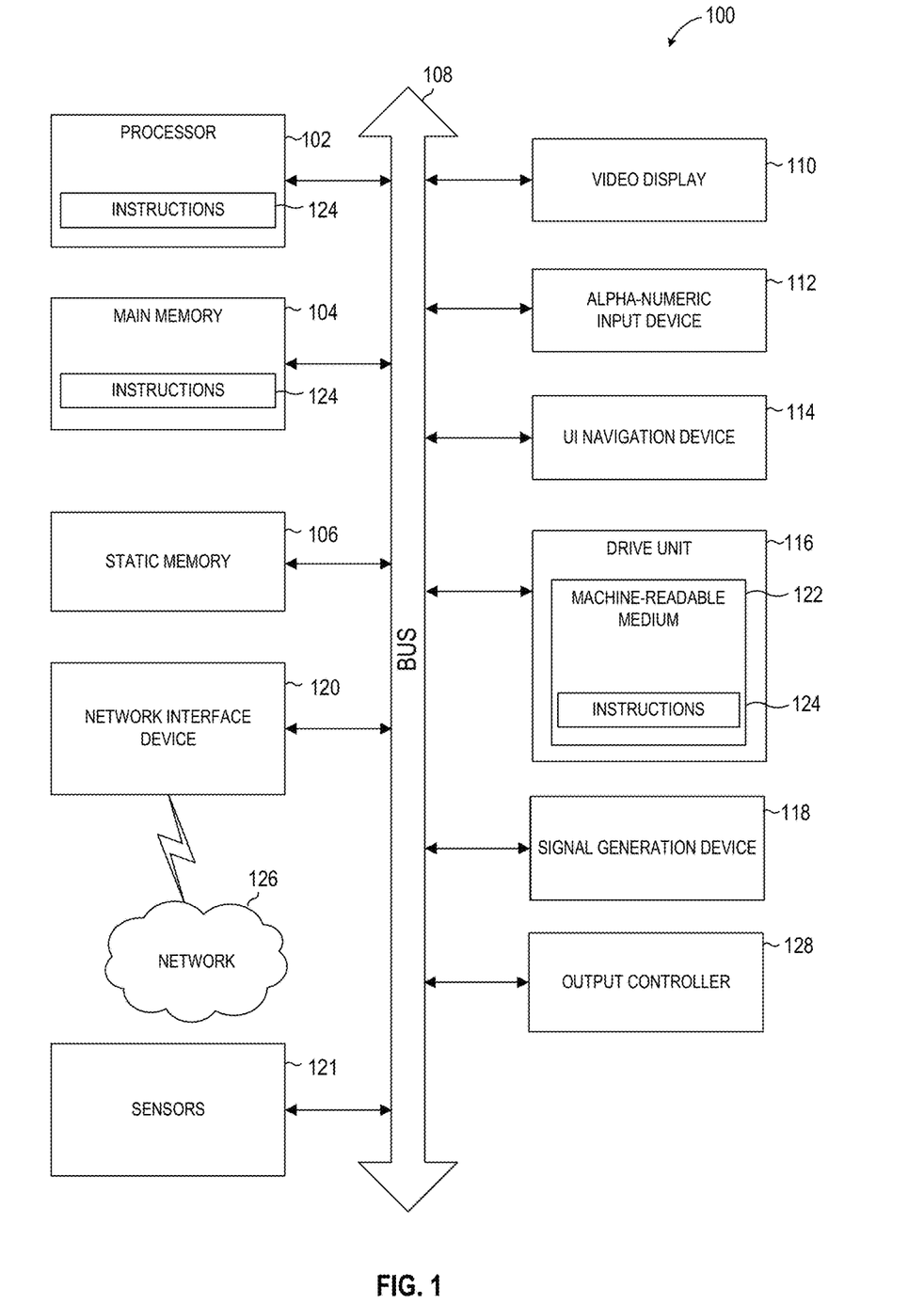
FIG. 1 is a block diagram of a computing machine, in accordance with some embodiments.

FIG. 1 illustrates a circuit block diagram of a computing machine 100 in accordance with some embodiments. In some embodiments, components of the computing machine 100 may store or be integrated into other components shown in the circuit block diagram of FIG. 1. For example, portions of the computing machine 100 may reside in the processor 102 and may be referred to as "processing circuitry." Processing circuitry may include processing hardware, for example, one or more central processing units (CPUs), one or more graphics processing units (GPUs), and the like. In alternative embodiments, the computing machine 100 may operate as a standalone device or may be connected (e.g., networked) to other computers. In a networked deployment, the computing machine 100 may operate in the capacity of a server, a client, or both in server-client network environments. In an example, the computing machine 100 may act as a peer machine in peer-to-peer (P2P) (or other distributed) network environment. In this document, the phrases P2P, device-to-device (D2D) and sidelink may be used interchangeably. The computing machine 100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 100 may include a hardware processor 102 (e.g., a central processing unit (CPU), a GPU, a hardware processor core, or any combination thereof), a main memory 104 and a static memory 106, some or all of which may communicate with each other via an interlink (e.g., bus) 108. Although not shown, the main memory 104 may contain any or all of removable storage and non-removable storage, volatile memory or non-volatile memory. The computing machine 100 may further include a video display unit 110 (or other display unit), an alphanumeric input device 112 (e.g., a keyboard), and a user interface (UI) navigation device 114 (e.g., a mouse). In an example, the display unit 110, input device 112 and UI navigation device 114 may be a touch screen display. The computing machine 100 may additionally include a storage device (e.g., drive unit) 116, a signal generation device 118 (e.g., a speaker), a network interface device 120, and one or more sensors 121, such as a global positioning system (GPS) sensor, compass, accelerometer, or other sensor. The computing machine 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 116 (e.g., a storage device) may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the computing machine 100. In an example, one or any combination of the hardware processor 102, the main memory 104, the static memory 106, or the storage device 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the computing machine 100 and that cause the computing machine 100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 124 may further be transmitted or received over a communications network 126 using a transmission medium via the network interface device 120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 120 may include one or more physical jacks (e.g., Ethernet, coaxial, or phone jacks) or one or more antennas to connect to the communications network 126.

The technology disclosed herein uses various engines, each of which is constructed, programmed, configured, or otherwise adapted, to carry out a function or set of functions. The term "engine" as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

Figure 2:
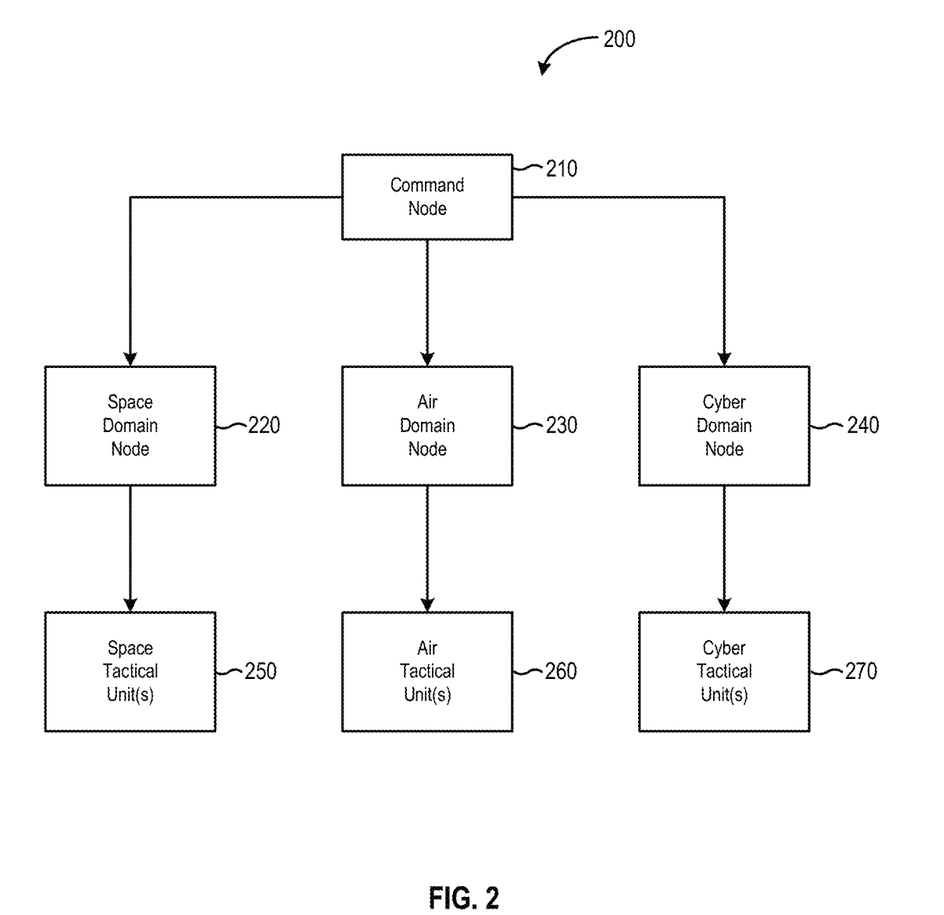
FIG. 2 illustrates an example tree structure representing a hierarchical organization, which may be stored in a memory of a computing machine, in accordance with some embodiments.

FIG. 2 illustrates an example tree structure 200 representing a hierarchical organization, which may be stored in a memory (e.g., the main memory 104, the static memory 106 or the machine-readable medium 122) of a computing machine (e.g., the computing machine 100), in accordance with some embodiments.

As shown, the tree structure includes a command node 210. In this illustrated example, the command node 210 has three branches below it—space domain node 220, air domain node 230, and cyber domain node 240. In other embodiments, a different number of domain nodes or domain nodes having different names (e.g., corresponding to different domains) may exist, such as for example, sea domain, land domain etc. As shown, the space domain node 220 has below it space tactical unit(s) 250. The air domain node 230 has below it air tactical unit(s) 260. The cyber domain node 240 has below it cyber tactical unit(s) 270. In some embodiments, the higher nodes may submit request(s) to nodes below them and receive confirmation(s) that the requests will be filled or denials of the requests. If a denial is received, the request is provided to another node. When a task associated with the request is completed, the lower node notifies the higher node. If a task cannot be completed, the lower node notifies the higher node, and the higher node assigns the task to a different lower node.

For example, the command node 210 may assign a task to space domain node 220. The space domain node 220 may reject the task. In response, the command node 210 assigns the task to air domain node 230. The air domain node 230 accepts the task and forwards it to one or more air tactical unit(s) 260 for completion. The air tactical unit(s) 260 are unable to complete the task, and notify the air domain node 230, which notifies the command node 210. The command node 210 then assigns the request to cyber domain node 240. The cyber domain node 240 assigns the task to one or more cyber tactical unit(s) 270. The cyber tactical unit(s) 270 complete the task and notify the cyber domain node 240, which notifies the command node 210 that the task has been successfully completed.

Figure 3:
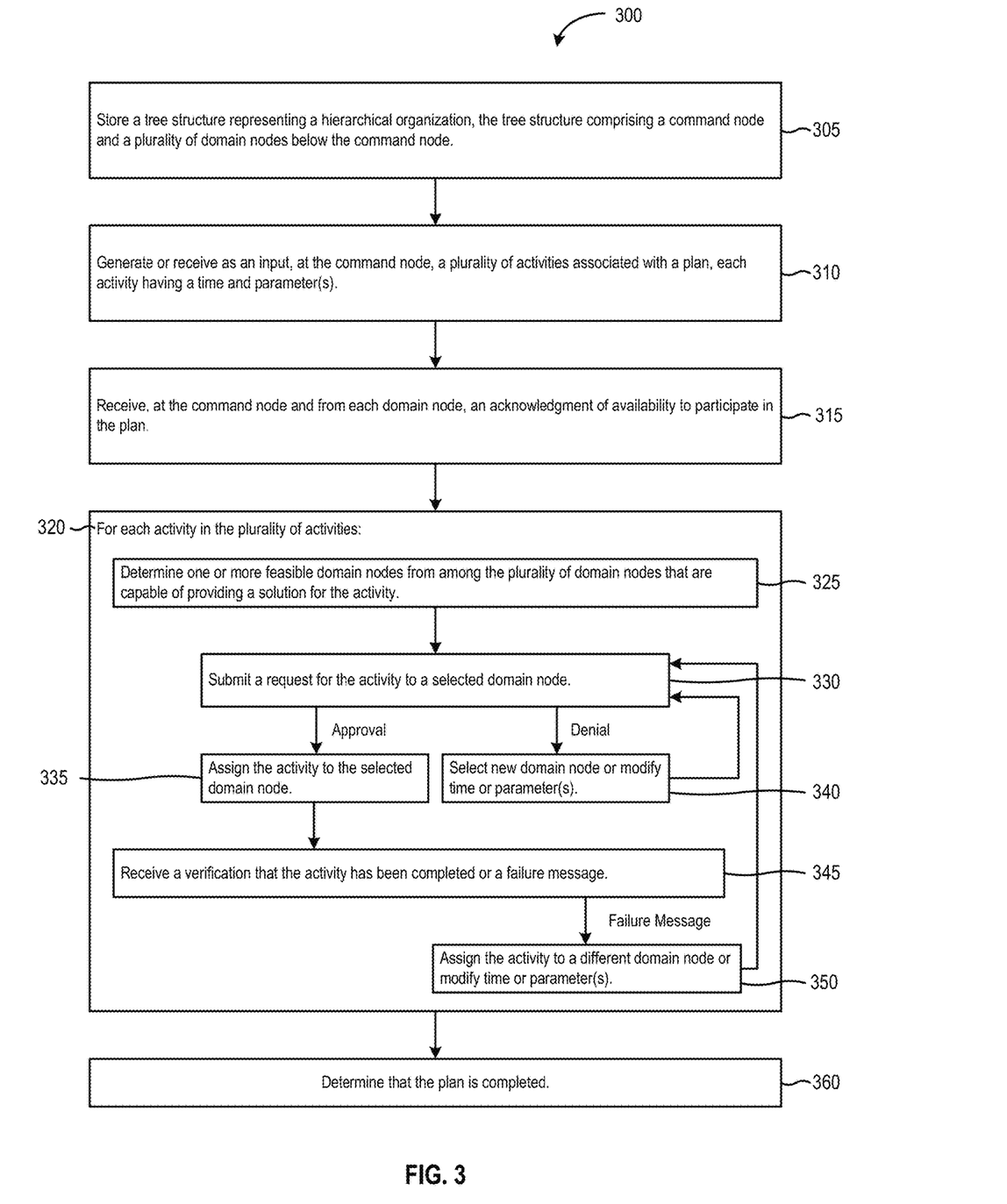
FIG. 3 is a flow chart of an example method for generating a multi-domain operational plan, in accordance with some embodiments.

FIG. 3 is a flow chart of an example method 300 for generating and/or implementing a multi-domain operational plan, in accordance with some embodiments. The method 300 may be implemented on a computing machine (e.g., the computing machine 100 of FIG. 1).

At operation 305, the computing machine stores, in an internal or external memory unit, a tree structure representing a hierarchical organization. The tree structure includes a command node (e.g., command node 210) and a plurality of domain nodes (e.g., space domain node 220, air domain node 230, and cyber domain node 240) below the command node. In some embodiments, the command node is associated with a military commander, and the plurality of domain nodes comprise one or more of: an air node, a land node, a sea node, a space node, and a cyber node. Alternatively, other types of domain nodes, for example, a police node, a fire node, a medical node, and the like may be used.

At operation 310, the computing machine generates or receives as an input (e.g., via an interface), at the command node, a plurality of activities associated with a multi-domain operational plan. Each activity has a time and one or more parameters. In some examples, the one or more parameters of the activity comprise at least one of: a geographic location, a required asset, a required weapon, a personnel requirement, a required timeline, and an imaging capability.

At operation 315, the computing machine, receives, at the command node and from each domain node, an acknowledgement of availability to participate in the multi-domain operational plan.

At operation 320, the computing machine, in response to the acknowledgements from the plurality of domain nodes, for each activity in the plurality of activities, completes operations 325-350.

At operation 325, the computing machine determines, based on communication between the command node and the plurality of domain nodes, one or more feasible domain nodes from among the plurality of domain nodes that are capable of providing a solution for the activity.

At operation 330, the computing machine submits a request for the activity to a selected domain node from the one or more feasible domain nodes. In some cases, response to receiving the request for the activity from the command node, the selected domain node: (i) verifies, based on the one or more parameters of the activity, availability of at least one asset to handle the activity, wherein the at least one asset is not assigned to another activity that conflicts with the activity; and (ii) verifies, based on the one or more parameters of the activity, at least one environmental condition to handle the activity.

In some cases, the selected domain node approving the request comprises the first domain node providing an acknowledgement message (ack) to the command node and to an additional domain node different from the selected domain node. The additional domain node may be another node that was considered for processing the request. In some cases, the first domain node denying the request comprises the first domain node providing a no acknowledgment message (nack) to the command node. If the request is approved, the method 300 continues to operation 335. If the request is denied, the method 300 continues to operation 340.

At operation 335, if the selected domain node approves the request, the computing machine assigns, via the command node, the activity to the first domain node. After operation 335, the method 300 continues to operation 345.

At operation 340, if the selected domain node denies the request, the computing machine assigns, via the command node, the activity to a different domain node or modifies the time or the one or more parameters of the activity. After operation 340, the method 300 returns to operation 330.

At operation 345, the computing machine receives, at the command node and from the selected domain node assigned the activity, a verification that the activity has been completed or a failure message. If the verification that the activity has been completed is received, the method 300 either returns to operation 325 with the next activity or, if there are no more activities left in the plurality of activities, continues to operation 360. If the failure message is received, the method 300 continues to operation 350.

At operation 350, if the failure message is received, the computing machine assigns, via the command node, the activity to a different domain node or modify the time or the one or more parameters of the activity. After operation 350, the method 300 returns to operation 330.

At operation 360, upon completion of each and every one of the plurality of activities, the computing machine determines, at the command node, that the multi-domain operational plan is completed. The computing machine provides an output representing that the multi-domain operational plan is completed. The output may be provided for display via a display port or for transmission (e.g., to an external storage unit) over a network or direct wired or wireless connection. After operation 360, the method 300 ends.

In some cases, the computing machine fails to assign at least one activity to each and every one of the plurality of domain nodes. In these cases, the computing machine provides an output representing that the multi-domain operational plan is not feasible.

As described above, the operations of the method 300 are performed in series and in a given order. However, in some cases, two or more operations may be performed in parallel. Also, as described above, the operations of the method 300 are performed at a single computing machine. However, in some cases, the performance of the method 300 may be distributed across multiple computing machines operating either in series or in parallel with one another.

Figure 4:
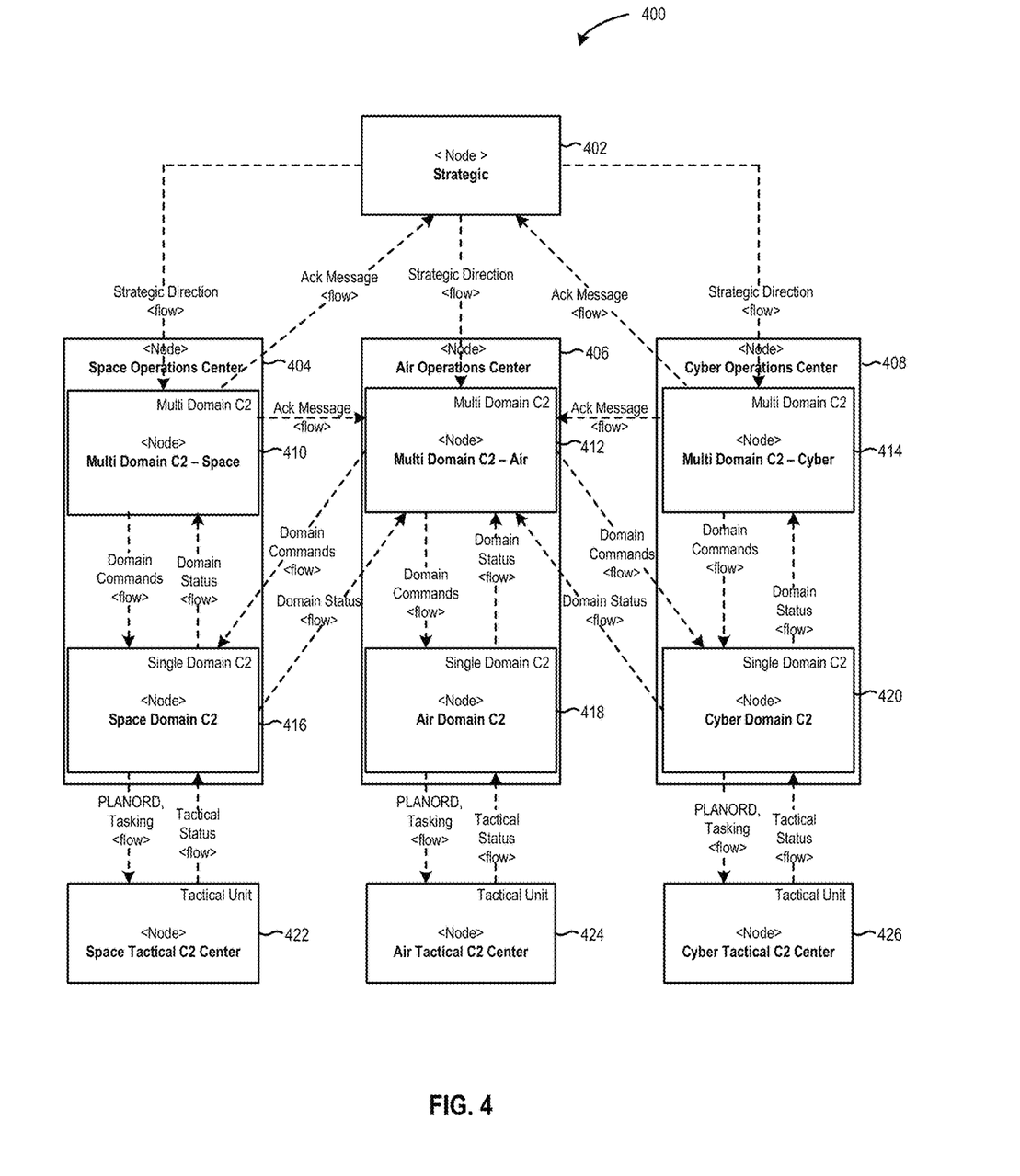
FIG. 4 illustrates an example data structure storing a multi-domain hierarchy, which may be stored in a memory of a computing machine, in accordance with some embodiments.

FIG. 4 illustrates an example data structure 400 storing a multi-domain hierarchy, which may be stored in a memory of a computing machine, in accordance with some embodiments. In this specific example shown in FIG. 4, a Strategic Node 402 communicates with Space Operations Center 404, An Air Operations Center 406, and a Cyber Operations Center 408. The Space Operations Center 404 communicates with the Space Tactical C2 Center 422. The Air Operations Center 406 communicates with the Air Tactical C2 Center 424. The Cyber Operations Center 408 communicates with the Cyber Tactical C2 Center 426. The Space Operations Center 404 includes "Multi Domain C2—Space" 410 and "Space Domain C2" 416.

The "Multi Domain C2—Space" 410 receives strategic direction(s) and sends ack or nack messages to communicates with the Strategic Node 402, the Air Operations Center 406, and the Cyber Operations Center 408, as discussed in conjunction with FIG. 3. The acknowledgement messages may include, without limiting, the availability of domain nodes to participate in the multi-domain operations, completion of tasks, or from tactical units or the like. The negative acknowledgement messages may include, without limiting, the non-availability of domain nodes to participate in the multi-domain operations, denial from tactical nodes or the like. The "Space Domain C2" 416 sends planning order (PLANORD) tasking and receives the tactical status to communicates with the Space Tactical C2 Center 422. In addition, the "Multi Domain C2—Space" 410 sends domain commands to the "Space Domain C2" 416, and receives the domain status from the "Space Domain C2" 416.

The Air Operations Center 406 includes "Multi Domain C2—Air" 412 and "Air Domain C2" 418. The "Multi Domain C2—Air" 412 receives strategic direction(s) and sends ack or nack messages to communicate with the Strategic Node 402, the Space Operations Center 406, and the Cyber Operations Center 408, as discussed in conjunction with FIG. 3. The acknowledgement messages may include, without limiting, the availability of domain nodes to participate in the multi-domain operations, completion of tasks, from tactical units or the like. The negative acknowledgement messages may include, without limiting, the non-availability of domain nodes to participate in the multi-domain operations, denial from tactical nodes or the like. The "Air Domain C2" 418 sends plan order (PLANORD) tasking and receives the tactical status to communicate with the air tactical C2 center 424. In addition, the "Multi Domain C2—Air" 412 sends domain commands to the "Air Domain C2" 418, and receives the domain status from the "Air Domain C2" 418.

The Cyber Operations Center 408 includes "multi domain C2—cyber" 414 and "cyber domain C2" 420. The "multi domain C2—cyber" 414 receives strategic direction(s) and sends ack or nack messages to communicate with the Strategic Node 402, the Air Operations Center 406, and the Space Operations Center 404, as discussed in conjunction with FIG. 3. The acknowledgement messages may include, without limiting, to the availability of domain nodes to participate in the multi-domain operations, completion of tasks, or from tactical units or the like. The negative acknowledgement messages may include, without limiting, the non-availability of domain nodes to participate in the multi-domain operations, denial from tactical nodes or the like. The "cyber domain C2" 420 sends plan order (PLANORD) tasking and receives the tactical status to communicate with the cyber tactical C2 center 426. In addition, the "multi domain C2—cyber" 414 sends domain commands to the "cyber domain C2" 420 and receives the domain status from the "cyber domain C2" 420.

The space operations center 404 includes "multi domain C2—space" 410 and "space domain C2" 416. The "multi domain C2—space" 410 communicates with the strategic node 402, the air operations center 406, and the cyber operations center 408, by receiving strategic direction(s) and sending ack or nack messages, as discussed in conjunction with FIG. 3. The "space domain C2" 416 communicates with the space tactical C2 center 422 by sending plan order (planord) tasking and receiving the tactical status. In addition, the "multi domain C2—space" 410 sends domain commands to the "space domain C2" 416 and receives, from the "space domain C2" 416, the domain status. In the air operations center 406, the "multi domain C2—air" 412 and "air domain C2" 418 operate similarly. In the cyber operations center 408, the "multi domain C2—cyber" 414 and "cyber domain C2" 420 operate similarly.

Figure 5:
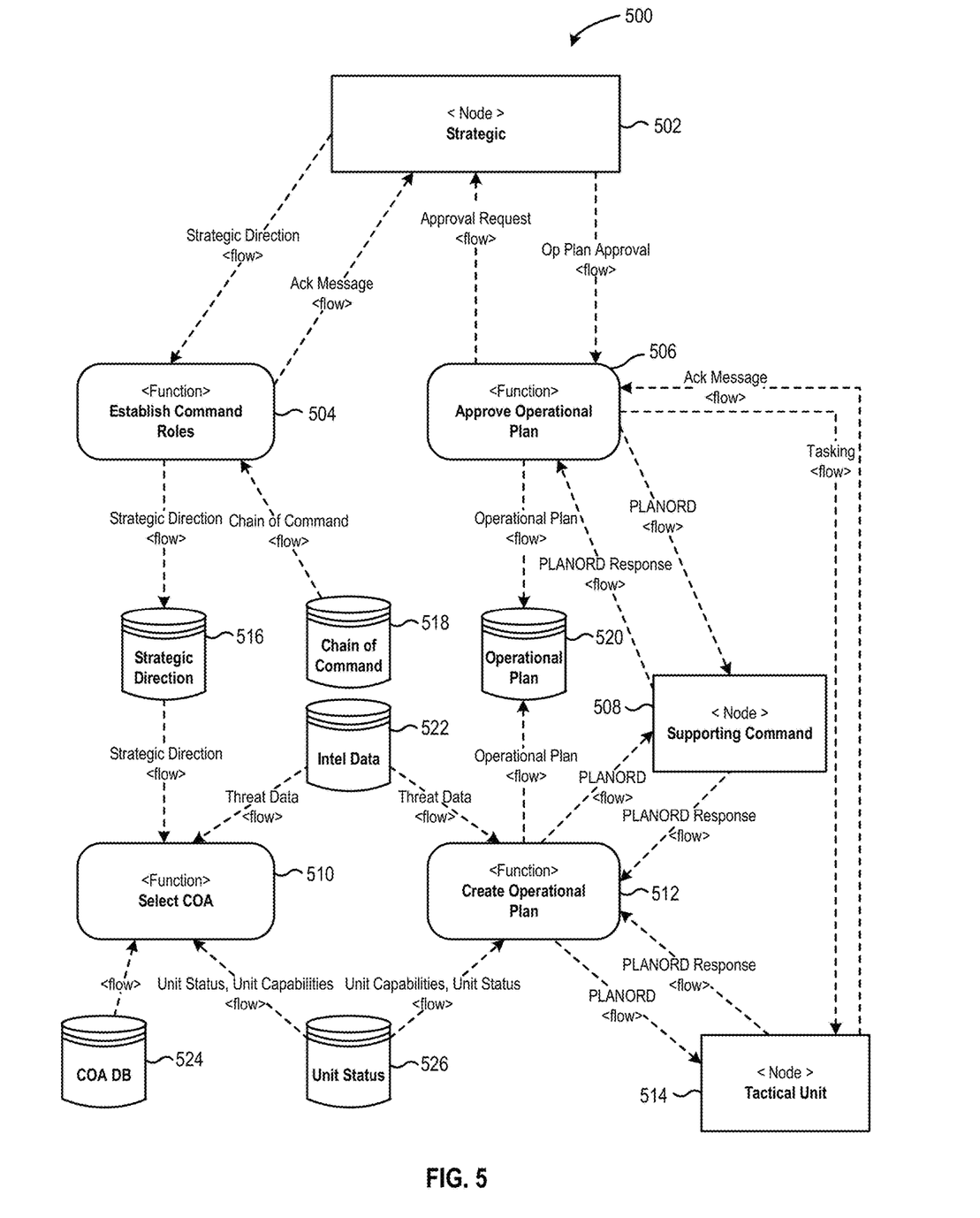
FIG. 5 is an example data flow diagram for generating a multi-domain operational plan, in accordance with some embodiments.

FIG. 5 is a data flow diagram 500 for generating a multi-domain operational plan, in accordance with some embodiments. As shown in FIG. 5, a Strategic Node 502 has an establish command roles function 504 and an Approve Operational Plan function 506. The Strategic Node 502 transmits strategic direction flow to Establish Command Roles function 504. The Establish Command Roles function 504 sends the Acknowledgement message to the Strategic Node 502. The establish command roles function 504 creates a strategic direction 516 using a chain of command 518. The strategic direction 516 transmits strategic direction flow to a Select Course of Action (COA) function 510.

Similarly, the Strategic Node 502 transmits operation plan approval flow to Approve Operational Plan Function 506. The Operational Plan Function 506 reverts the approval request to the Strategic Node 502. The Approve Operational Plan Function 506 approves the Operational Plan 520 using the operational plan flow, based on Supporting Command Node 508 and the Tactical Unit Node 514. The Supporting Command Node 508 receives planning order (PLANORD) flow from Approve Operational Plan Function 506 and acknowledges back to Approve Operational Plan function 506 with planning order (PLANORD) Response flow. The Approve Operational Plan Function 506 transmits tasking flow to the Tactile Unit Node 514 which transmits back the acknowledgement message flow to the Approve Operational Plan Function 506. The acknowledgement messages may include but not limited to the availability to participate in the multi-domain operational plan, acknowledgement from the plurality of domain nodes for a particular activity or the like. The Create operational plan function 512 creates the Operational plan 520 based on Intel data 522, the tactical unit node 514, the supporting command node 508, and the unit status 526. The Create Operational Plan Function 512 transmits planning order (PLANORD) Response flow to the Supporting Command Node 508 and the Tactical Unit Node 514 and receives the planning order (PLANORD) Response flow from the Supporting Command Node 508 and the Tactical Unit Node 514. The Create Operational Plan Function receives the threat data flow from the Intel Data 522 and unit capabilities and unit status flow from the Unit Status 526. The Select SOA Function 510 leverages threat data flow from Intel Data 522, strategic direction flow from the Strategic Direction 516, unit capabilities and unit status flow from the Unit Status 526 and flow the Course of Action Database (COA DB) 524, to select a source of action (SOA).

Figure 6:
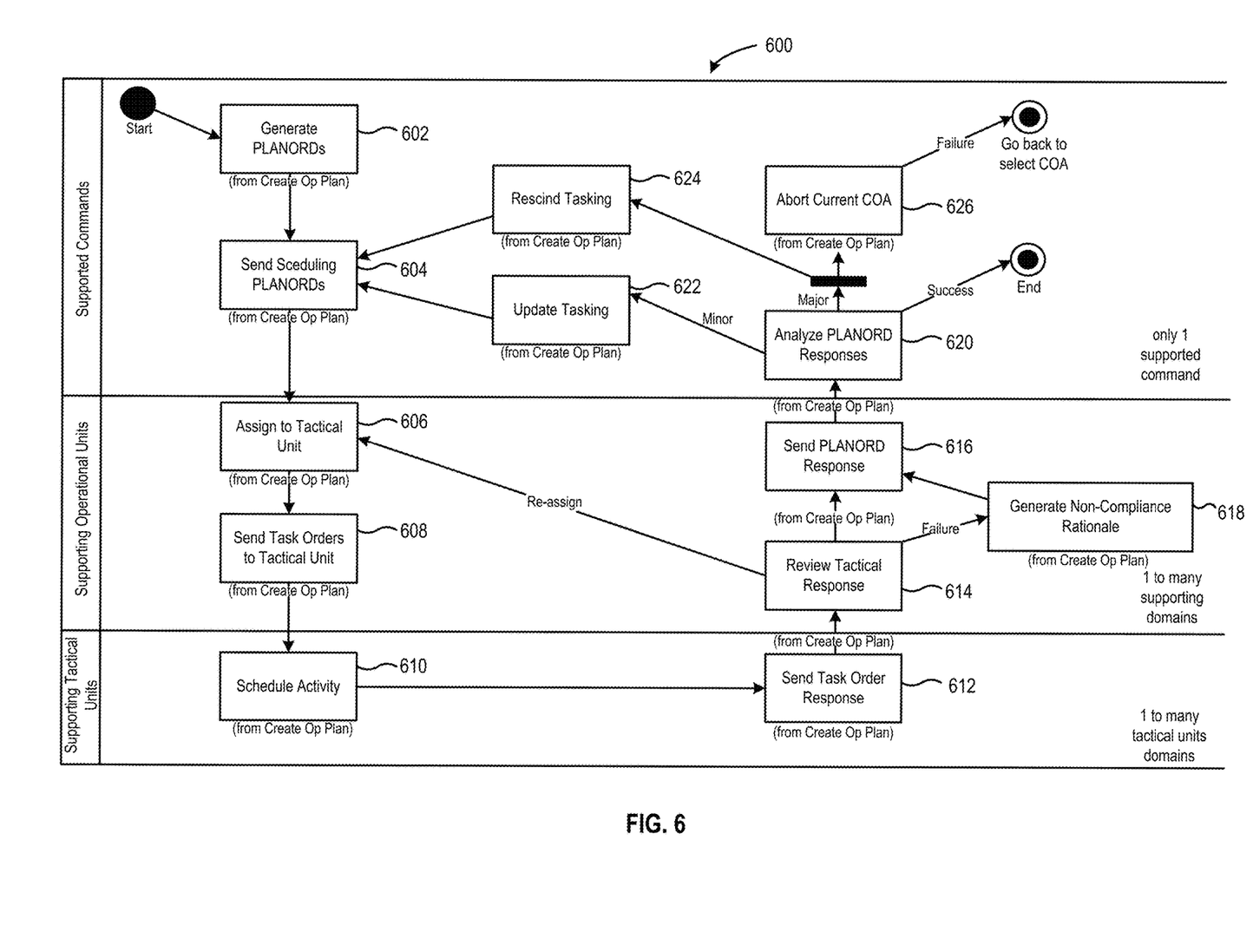
FIG. 6 is an example data flow diagram for task flow planning, in accordance with some embodiments.

FIG. 6 is a data flow diagram 600 for detailed task flow planning, in accordance with some embodiments. As shown, the data flow diagram 600 includes a set of supported commands, a plurality of supporting operational units, and a plurality of supporting tactical units. The supported commands include generate PLANORDs (plan orders) 602, rescind tasking 624, abort current COA (course of action) 626, send scheduling PLANORDs 604, update tasking 622, and analyze PLANORD reports 620. The supporting operational units: assign to tactical units 606, send task orders to tactical unit 608, send PLANORD response 616, review tactical response 614, and generate a non-compliance rationale 618. The supporting tactical units schedule activity 610 and send task order response 612.

The Planning orders (PLANORDs) are generated at Generate PLANORDs 602. The next command Send Scheduling PLANORDs 604 is initiated. The generated PLANORDs are assigned to the Tactical units 606 at Assign to Tactical Unit 606. Task orders are sent to the Tactical units at Send Task Orders to Tactical Units 608. The supporting Tactical Unit schedules activity for PLANORDs at Schedule Activity 610. A Task order response for the scheduled activity is then sent the Send Task Order Response 612. The system then reviews the tactical response at Review Tactical Unit 614. Upon failure, a non-compliance rational is generated at 618 and a PLANORD response is then sent at 616. A supported command Analyze PLANORD Response 620 is initiated which analyzes the PLANORD response received from one of the supporting operational unit Send PLANORD Response 616. The flow after the review of tactical response is redirected to the Assign to Tactical Unit 606 in case of any re-assignment. The flow ends upon successful PLANORD response. If the deviation from the desired response is Major, the flow is re-directed to Rescind Tasking 624, followed by Scheduling of the PLANORDs once again at 604, and the current COA is Aborted at 626 in case of a failed response. In case of Minor deviation, the supporting command of Updating Tasking 622 is initiated, followed by sending the Scheduling PLANORDs 604.

Figure 7:
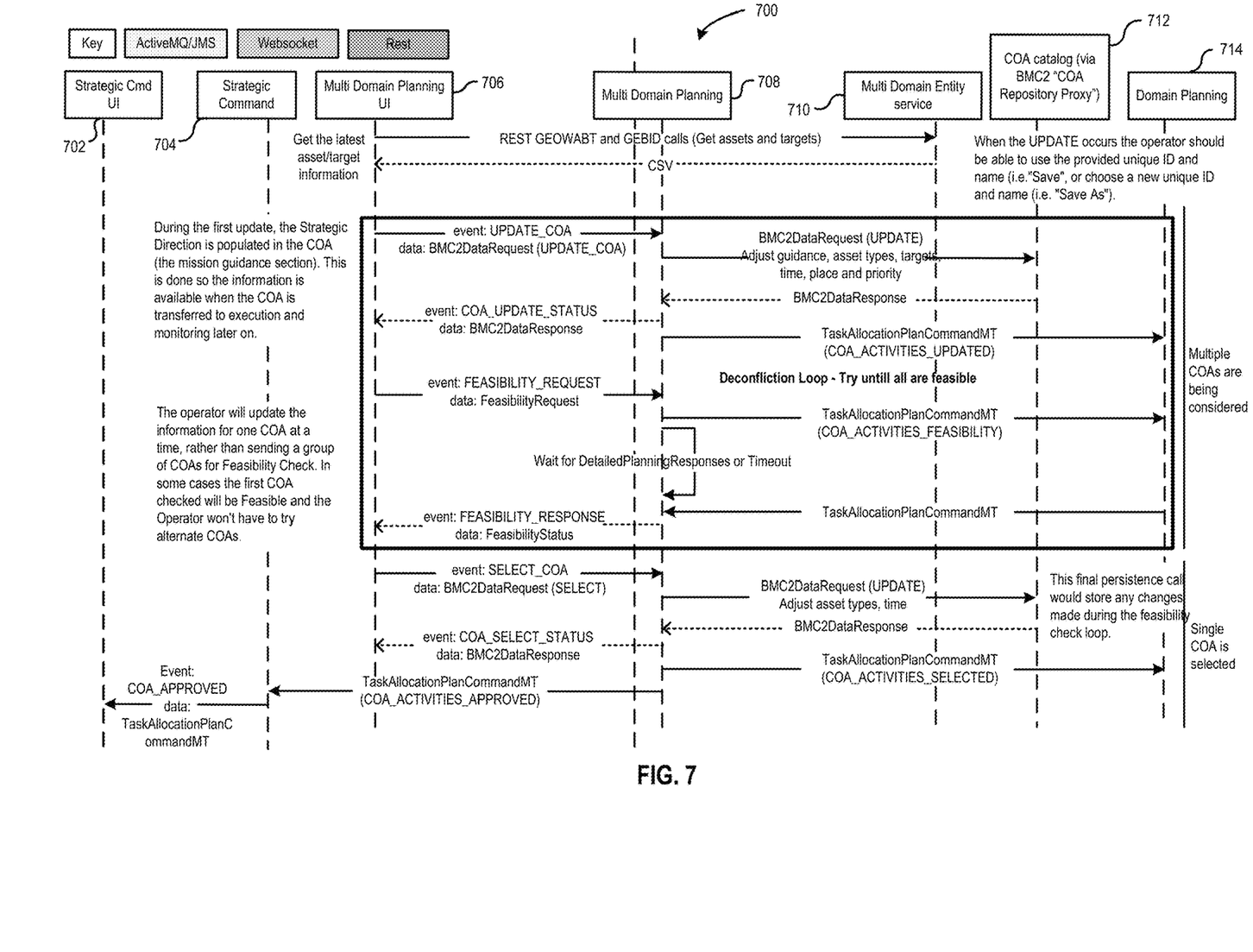
FIG. 7 is an example data flow diagram for creating a multi-domain operational plan, in accordance with some embodiments.

FIG. 7 is a data flow diagram 700 for detailed operational planning, in accordance with some embodiments. As shown, the data flow diagram 700 includes Strategic Command UI 702, Strategic Command 704, Multi Domain Planning UI 706, Multi Domain Planning 708, Multi Domain Entity Service 710, COA Catalog (via BMC2 "COA Repository Proxy") 712, and Domain Planning 714.

As illustrated in FIG. 7, the strategic command UI 702, the strategic command 704, the multi-domain planning UI 706, the multi-domain planning 708, the multi-domain entity service 710, the COA catalog 712, and the domain planning 714 exchange a plurality of instructions. As shown, the Multi Domain Planning UI 706 calls to get the asset and target information in the form of REST GEOWABT and GEBID calls, to the Multi Domain Entity Service 710. The Multi Domain Entity Service 710 instructs with CSV to the Multi Domain Planning UI 706. For the COA catalog 712 and the Domain Planning 714, when the UPDATE occurs, the operator should be able to use the provided unique ID and name (i.e., "Save"), or choose a new unique ID and name (i.e., "Save As"). The Multi Domain Planning UI 706 sends a BMC2 Data Request to the update the COA in the form of UPDATE COA, to the Multi Domain Planning 708. The Multi Domain Planning 708 sends a BMC2 Data Request to adjust guidance, asset types, targets, set time, place and priority, to the COA Catalog 712. The COA Catalog 712 transmits the BMC2 Data Response, to the Multi Domain Planning 708. The Multi Domain Planning 708 transmits the update status in the form of COA UPDATE STATUS and the BMC2 Data Response, to the Multi Domain Planning UI 706. In the strategic command, the Strategic Direction is populated in the COA (the mission guidance section) during the first update. This is done in order to make the information available when the COA is transferred to execution and monitoring at a later stage. The Multi Domain Planning 708 commands the Domain Planning 714 for Task Allocation Plan with COA ACTIVITIES UPDATED. The Multi Domain Planning UI 706 transmits a feasibility request in the form of FEASIBILITY REQUEST to the Multi Domain Planning 708. A deconfliction loop is provided to try until all the tasks are feasible. The Multi Domain Planning 708 commands the Domain Planning 714 for Task Allocation Plan with COA ACTIVITIES FEASIBILITY.

In the Strategic Command, the operator updates the information for one COA at a time, rather than sending a plurality of COAs for Feasibility Check. In a case where the first COA checked is feasible, the operator need not try alternate COAs. The Multi-Domain Planning 708 waits for detailed planning responses or timeout. The Domain Planning 714 transmits the Task Allocation Plan Command MT to the Multi Domain Planning 708. The Multi Domain Planning 708 transmits the feasibility status in the form of FEASIBILITY RESPONSE to the Multi Domain Planning UI 706. The Multi Domain Planning UI 706 transmits BMC2 Data Request (SELECT) to the Multi Domain Planning 708 as SELECT COA. The Multi Domain Planning 708 transmits the BMC2 Data Request (UPDATE) to the COA Catalog 712 to adjust the asset types, and time. This final persistence call stores any changes made in the feasibility check loop. The COA Catalog 712 transmits the BMC2 Data Response to the Multi Domain Planning 708. The Multi Domain 708 transmits the BMC2 Data Response, to the Multi Domain Planning 706 as COA SELECT STATUS. The Multi Domain Planning 708 transmits, the Task Allocation Plan Command MT to the Domain Planning 714 as COA ACTIVITIES SELECTED. The Multi Domain Planning 708 commands the Strategic Command 704 for the Task Allocation Plan Command MT as COA ACTIVITIES APPROVED. The Strategic Command 704 transmits the Task Allocation Plan Command MT to the Strategic Cmd UI 702 as COA APPROVED.

Figure 8:
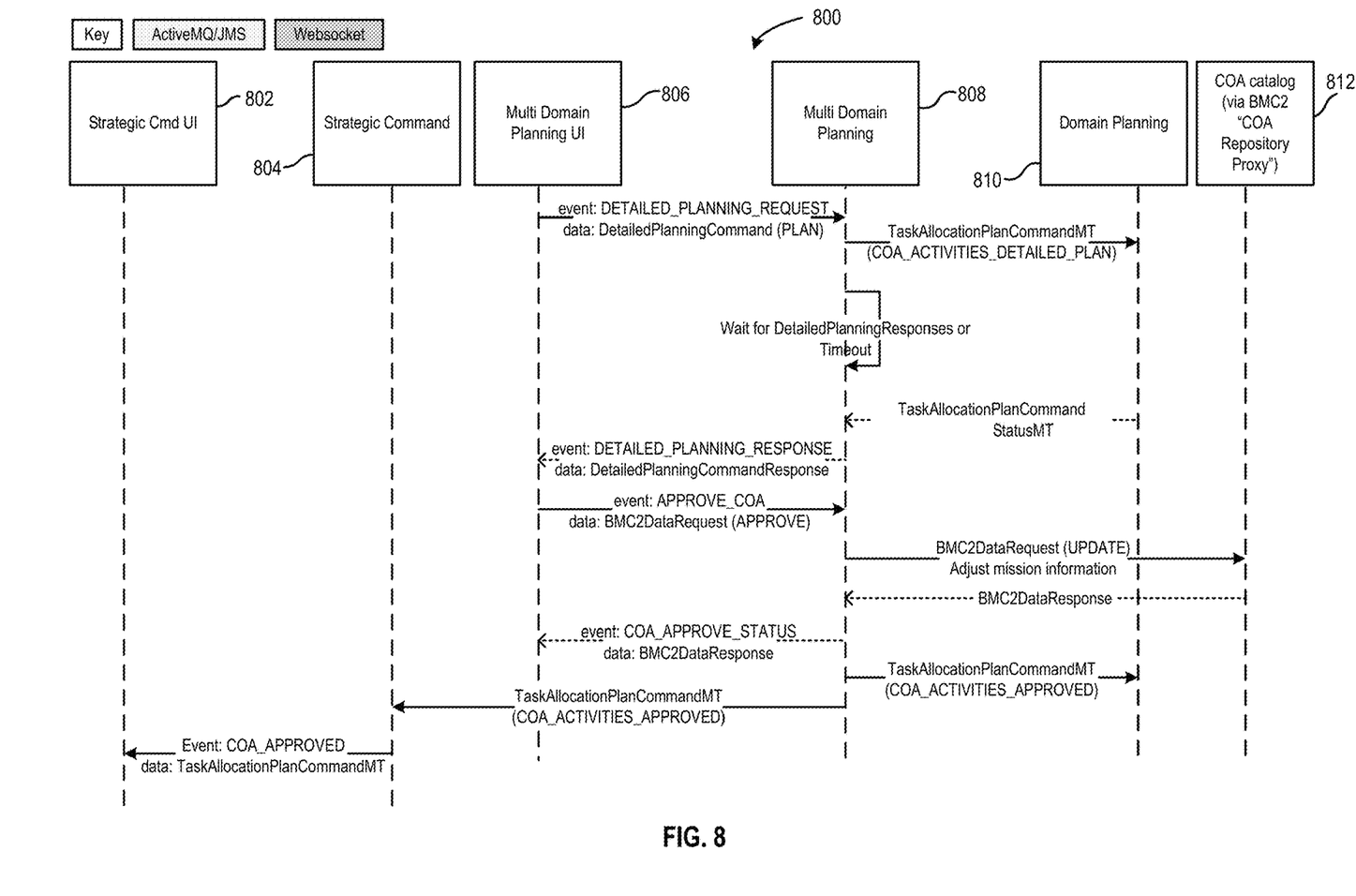
FIG. 8 is an example data flow diagram for detailed operational planning, in accordance with some embodiments.

FIG. 8 is a data flow diagram 800 for detailed operational planning, in accordance with some embodiments. As shown, similar to FIG. 7, the data flow diagram 800 includes strategic command UI 802, strategic command 804, multi-domain planning UI 806, multi-domain planning 808, domain planning 810, and COA catalog 812 (via BMC2 "COA repository proxy").

As shown, multi-domain planning UI 806 transmits to multi-domain planning 808—event: DETAILED PLANNING REQUEST, and data: Detailed Planning Command (PLAN). Multi-domain planning 808 transmits to domain planning 810 Task Allocation Plan Command MT (COA Activities Detailed Plan). Multi-Domain Planning 808 waits for detailed planning responses or timeout. Task Allocation Plan Command Status MT is transmitted from domain planning 810 to multi-domain planning 808. Multi-domain planning 808 transmits, to multi-domain planning UI 806, event: DETAILED PLANNING RESPONSE, data: detailed planning command response. Multi-domain planning UI 806 transmits, to multi-domain planning 808, event: approve COA, data: BMC2 data request (approve). Multi-domain planning 808 transmits, to COA catalog 812, BMC2 Data Request (UPDATE) adjust mission information. COA catalog 810 transmits, to multi-domain planning, BMC2 data response. Multi-domain planning 808 transmits, to multi-domain UI, event: COA APPROVE STATUS, data: BMC2 Data Response. Multi-domain planning 808 transmits, to domain planning 810, task allocation plan command MT (COA ACTIVITIES APPROVED). Multi-domain planning 808 transmits, to strategic command 804, task allocation plan command MT (COA ACTIVITIES APPROVED). Strategic command 804 transmits, to strategic command UI, Event: COA APPROVED, data: Task Allocation Plan Command MT.

Figure 9:
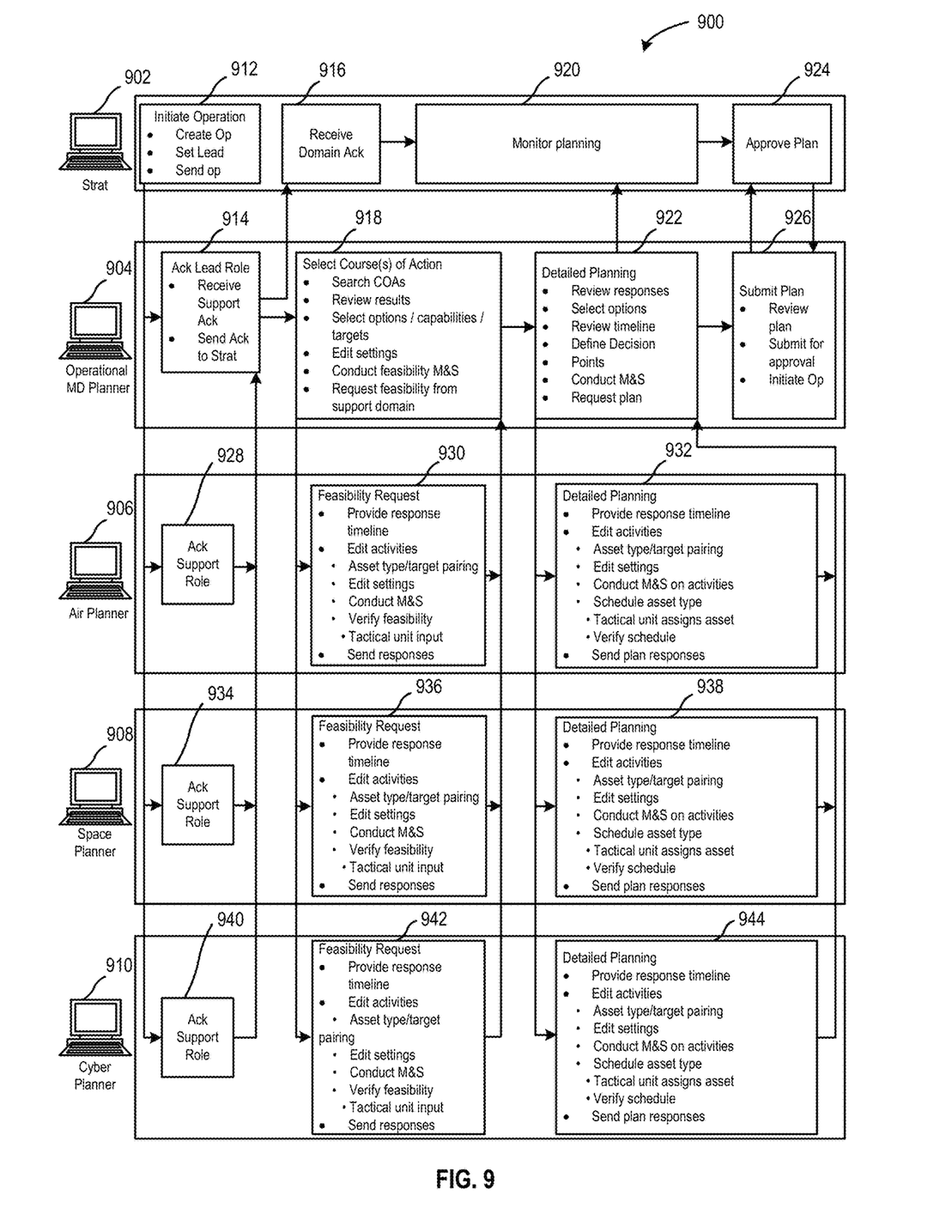
FIG. 9 is an example data flow diagram for high level task flow planning, in accordance with some embodiments.

FIG. 9 is a data flow diagram 900 for high level task flow planning, in accordance with some embodiments. As shown, the data flow diagram 900 includes a Strat 902, an Operation MD Planner 904, an Air Planner 906, a Space Planner 908, and a Cyber Planner 910. The Start 902 includes an Initiate Operation 912, a Receive Domain Acknowledgement (Ack) 916, a Monitor Planning 920, and an Approve Plan 924. The Operational MD Planner 904 includes an Ack Lead Role 914, a Select Course(s) of Action 918, a Detailed Planning 922 and a Submit Plan 926. The Air Planner 906 includes a first Ack Support Role 928, a first Feasibility Request 930 and a first Detailed Planning 932. The Air Planner 906 is followed by the Space Planner 908, which includes a second Ack Support Role 934, a second Feasibility Request 936 and a second Detailed Planning 938. The Cyber Planner 910 includes a third Ack Support Role 940, a third Feasibility Request 942 and a third Detailed Planning 944.

The data flow of FIG. 9 for high level task flow planning begins with the Strat 902. The Initiate Operation 912 of the Strat 902 sends a plurality of commands to the Operational MD Planner 904, the Air Planner 906, the Space Planner 908 and the Cyber Planner 910. The Initiate Operation 912 includes a plurality of steps including: Creation of Operations, Setting leads for the operations, and Sending the operations to different Planners. (i.e., the Operational MD Planner 904, the Air Planner 906, the Space Planner 908 and the Cyber Planner 910).

The Initial Operation 912 of the Strat 902 commands the Operational MD Planner 904 for Ack Lead role 914, and the Air Planner 906 for the first Ack Support Role 928, the Space Planner 908 for the second Ack support role 934, and the Cyber Planner 910 for the third Ack support role 940. The Strat 902 receives a domain Ack at the Receive Domain Ack 916 from the Ack Lead Role 914. The flow then redirects from the first Ack Support Role 928, the second Ack Support Role 934, and the third Ack Support Role 940 towards the Ack Lead role 914 of the Operational MD Planner 904, which then follows selection of COA at the Select Course(s) of Action 918.

The Select Course(s) of Action (COAs) 918 transmits the Feasibility Request to the Air Planner 906, the Space Planner 908 and the Cyber Planner 910 simultaneously, as the first Feasibility Request 930, the second Feasibility Request 936, and the third Feasibility Request 942 respectively. The Feasibility Request includes: providing the response timeline followed by editing the activities, and sending the responses. In one embodiment, the request to edit the activities may further include the asset type/target pairing, edit settings, conduct M & S, verify feasibility and tactical unit input. The flow then redirects from the first Feasibility Request 930, the second Feasibility Request 936, and the third Feasibility Request 942 towards the Select Course(s) of Action 918 of the Operational MD Planner 904. The Detailed Planning 922 occur at the operational MD Planner 904. In one embodiment of the present invention, the Detailed Planning 922 may include reviewing the received responses, selection of options, reviewing timelines, defining decisions, points, conducting M & S and requesting the plan.

The Detailed Planning 922 are monitored by the Monitor Planning 920 of the Strat 902. The Detailed Planning 922 of the Operational MD Planner 904 transmits the commands simultaneously to the first Detailed Planning 932, the second Detailed Planning 938, and the third Detailed Planning 944. In another embodiment of the present invention the first Detailed Planning 932, the second Detailed Planning 938, and the third Detailed Planning 944 may include providing response timeline, editing the activities and sending plan responses to the Operational MD Planner 904. The Edit Activities of the first Detailed Planning 932, the second Detailed Planning 938, and the third Detailed Planning 944 may further include the asset type/target pairing, edit settings, conduct M & S on activities, schedule asset type, tactical unit assigns assets and verifying the schedule. The responses collected from the first Detailed Planning 932, the second Detailed Planning 938, and the third Detailed Planning 944 are forwarded to the Detailed Planning 922 of the Operational MD Planner 904 followed by the further flow to the Submit Plan 926 as the Submit Plan 926. The Submit Plan 926 is then redirected to the Strat 902 for approval. After that the plan is approved in the Approval Plan 924. In one embodiment, the submit plan includes reviewing the plan, submitting the plan for approval, and initiating the plan of approval.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A multi-domain operational planning apparatus comprising:
    a memory storing a tree structure representing a hierarchical organization, the tree structure comprising a command node and a plurality of domain nodes below the command node; and
    processing circuitry in communication with the memory, the processing circuitry configured to:
    receive, at the command node and from each domain node; an acknowledgment of availability to participate in a multi-domain operational plan;
    in response to the acknowledgements from the plurality of domain nodes and for each activity in a plurality of activities associated with the multi-domain operational plan:
    determine, based on communication between the command node and the plurality of domain nodes, one or more feasible domain nodes from among the plurality of domain nodes that are capable of providing a solution for the activity;
    assign, via the command node, the activity to a first domain node from the one or more feasible domain nodes;
    if the first domain node denies the assignment, assign, via the command node, the activity to a second domain node or modify a time or one or more parameters of the activity;
    receive, at the command node and from a domain node assigned the activity, a verification that the activity has been completed or a failure message;

if the failure message is received, assign, via the command node, the activity to a different domain node or modify the time or the one or more parameters of the activity; and upon completion of each and every one of the plurality of activities, provide an output representing that the multi-domain operational plan is completed.

2. The apparatus of claim 1, wherein the processing circuitry is further configured to:

upon failure to assign at least one activity to each and every one of the plurality of domain nodes: provide an output representing that the multi-domain operational plan is not feasible.

3. The apparatus of claim 1, wherein the first domain node, in response to receiving the assignment of the activity from the command node:

verifies, based on the one or more parameters of the activity, availability of at least one asset to handle the activity, wherein the at least one asset is not assigned to another activity that conflicts with the activity; and verifies, based on the one or more parameters of the activity, at least one environmental condition to handle the activity.

4. The apparatus of claim 1, wherein the command node is associated with a military commander, and wherein the plurality of domain nodes comprise one or more of: an air node, a land node, a sea node, a space node, and a cyber node.

5. The apparatus of claim 1, wherein the first domain node accepting the assignment comprises the first domain node providing an acknowledgement message (ack) to the command node and to an additional domain node different from the first domain node.

6. The apparatus of claim 1, wherein the first domain node denying the assignment comprises the first domain node providing a no acknowledgment message (nack) to the command node.

7. The apparatus of claim 1, wherein the one or more parameters of the activity comprise at least one of: a geographic location, a required asset, a required weapon, a personnel requirement, a required timeline, and an imaging capability.

8. A non-transitory machine-readable medium storing instructions which, when executed by a computing machine, cause the computing machine to:

receive, at the command node and from each domain node, an acknowledgment of availability to participate in a multi-domain operational plan;

in response to the acknowledgements from the plurality of domain nodes and for each activity in a plurality of activities associated with the multi-domain operational plan:

determine, based on communication between the command node and the plurality of domain nodes, one or more feasible domain nodes from among the plurality of domain nodes that are capable of providing a solution for the activity;

assign, via the command node, the activity to a first domain node from the one or more feasible domain nodes;

if the first domain node denies the assignment, assign, via the command node, the activity to a second domain node or modify a time or one or more parameters of the activity;

receive, at the command node and from a domain node assigned the activity, a verification that the activity has been completed or a failure message;

if the failure message is received, assign, via the command node, the activity to a different domain node or modify the time or the one or more parameters of the activity; and upon completion of each and every one of the plurality of activities, provide an output representing that the multi-domain operational plan is completed.

9. The machine-readable medium of claim 8, wherein the processing circuitry is further configured to:

upon failure to assign at least one activity to each and every one of the plurality of domain nodes: provide an output representing that the multi-domain operational plan is not feasible.

10. The machine-readable medium of claim 8, wherein the first domain node, in response to receiving the assignment of the activity from the command node:

verifies, based on the one or more parameters of the activity, availability of at least one asset to handle the activity, wherein the at least one asset is not assigned to another activity that conflicts with the activity; and verifies, based on the one or more parameters of the activity, at least one environmental condition to handle the activity.

11. The machine-readable medium of claim 8, wherein the command node is associated with a military commander, and wherein the plurality of domain nodes comprise one or more of: an air node, a land node, a sea node, a space node, and a cyber node.

12. The machine-readable medium of claim 8, wherein the first domain node accepting the assignment comprises the first domain node providing an acknowledgement message (ack) to the command node and to an additional domain node different from the first domain node.

13. The machine-readable medium of claim 8, wherein the first domain node denying the assignment comprises the first domain node providing a no acknowledgment message (nark) to the command node.

14. The machine-readable medium of claim 8, wherein the one or more parameters of the activity comprise at least one of: a geographic location, a required asset, a required weapon, a personnel requirement, a required timeline, and an imaging capability.

15. A method comprising:

receive, at the command node and from each domain node, an acknowledgment of availability to participate in a multi-domain operational plan;

in response to the acknowledgements from the plurality of domain nodes and for each activity in a plurality of activities associated with the multi-domain operational plan:

determine, based on communication between the command node and the plurality of domain nodes, one or more feasible domain nodes from among the plurality of domain nodes that are capable of providing a solution for the activity;

assign, via the command node, the activity to a first domain node from the one or more feasible domain nodes;

if the first domain node denies the assignment, assign, via the command node, the activity to a second domain node or modify a time or one or more parameters of the activity;

receive, at the command node and from a domain node assigned the activity, a verification that the activity has been completed or a failure message;

if the failure message is received, assign, via the command node, the activity to a different domain node or modify the time or the one or more parameters of the activity; and upon completion of each and every one of the plurality of activities, provide an output representing that the multi-domain operational plan is completed.

16. The method of claim 15, wherein the processing circuitry is further configured to:

upon failure to assign at least one activity to each and every one of the plurality of domain nodes: provide an output representing that the multi-domain operational plan is not feasible.

17. The method of claim 15; wherein the first domain node, in response to receiving the assignment of the activity from the command node:

verifies, based on the one or more parameters of the activity, availability of at least one asset to handle the activity, wherein the at least one asset is not assigned to another activity that conflicts with the activity; and verifies, based on the one or more parameters of the activity, at least one environmental condition to handle the activity.

18. The method of claim 15, wherein the command node is associated with a military commander, and wherein the plurality of domain nodes comprise one or more of: an air node, a land node, a sea node, a space node, and a cyber node.

19. The method of claim 15, wherein the first domain node accepting the assignment comprises the first domain node providing an acknowledgement message (ack) to the command node and to an additional domain node different from the first domain node.

20. The method of claim 15, wherein the first domain node denying the assignment comprises the first domain node providing a no acknowledgment message (hack) to the command node.

* * * * *